April 3, 1962 A. L. COLLINS 3,028,462
SPEED GOVERNOR FOR ELECTRIC MOTORS
Filed Nov. 5, 1958 3 Sheets-Sheet 1
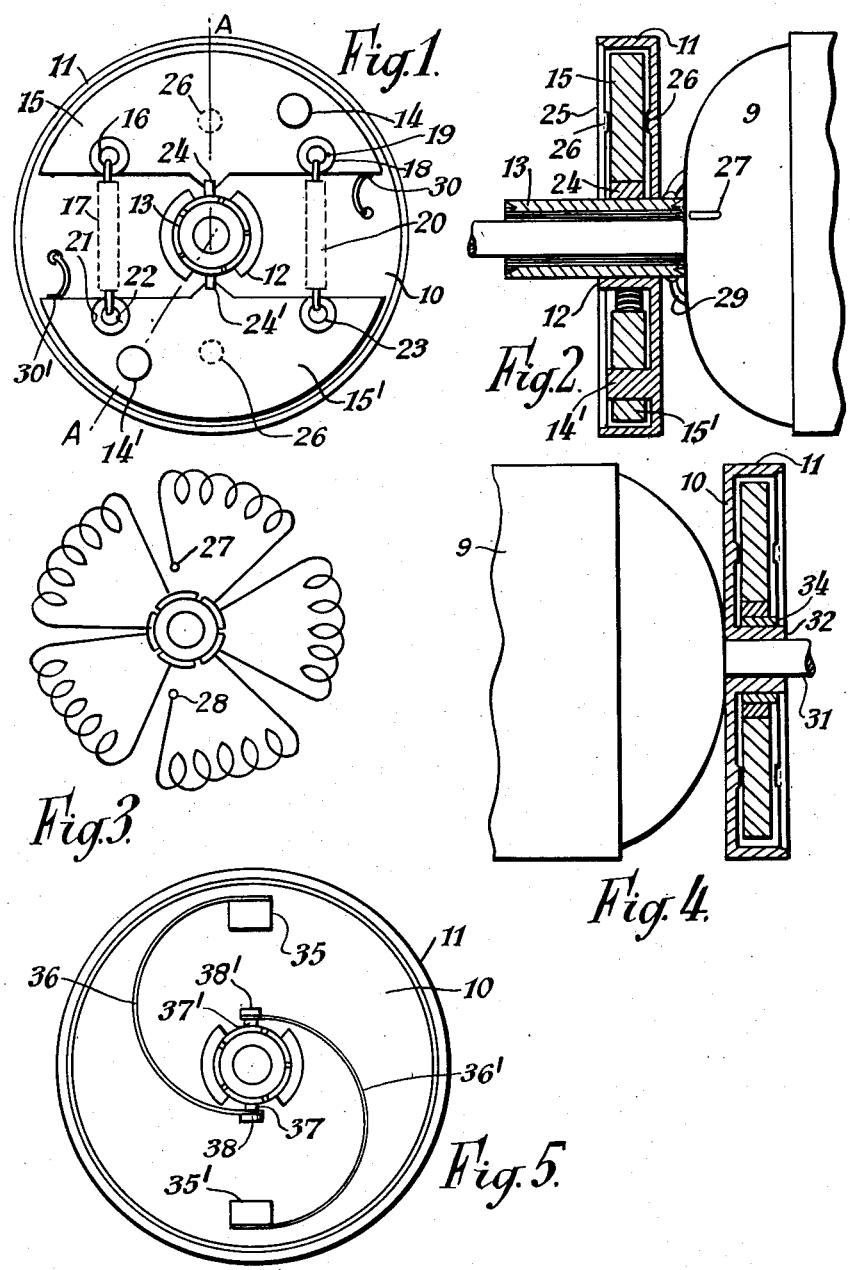
INVENTOR
Aubrey Lawrence Collins
BY
ATTORNEYS

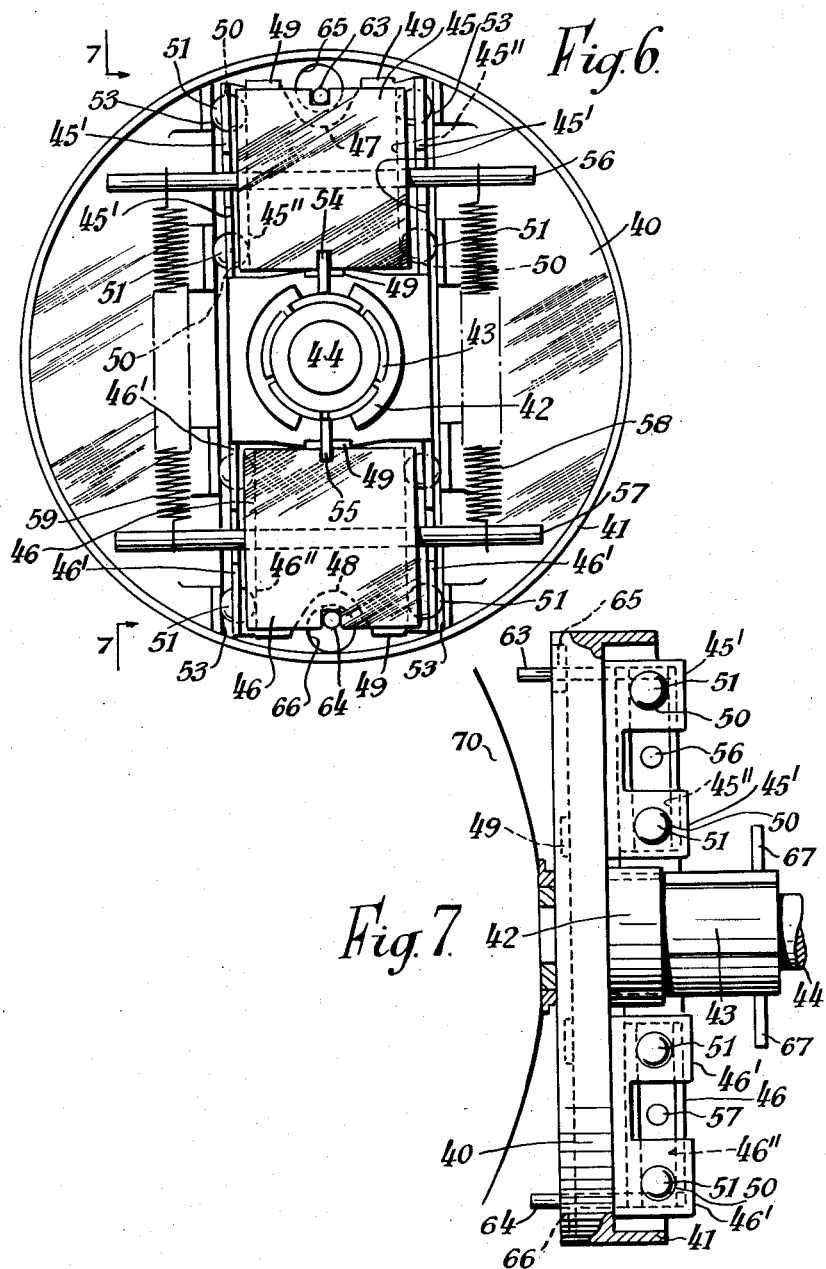

April 3, 1962   A. L. COLLINS   3,028,462
SPEED GOVERNOR FOR ELECTRIC MOTORS
Filed Nov. 5, 1958   3 Sheets-Sheet 3
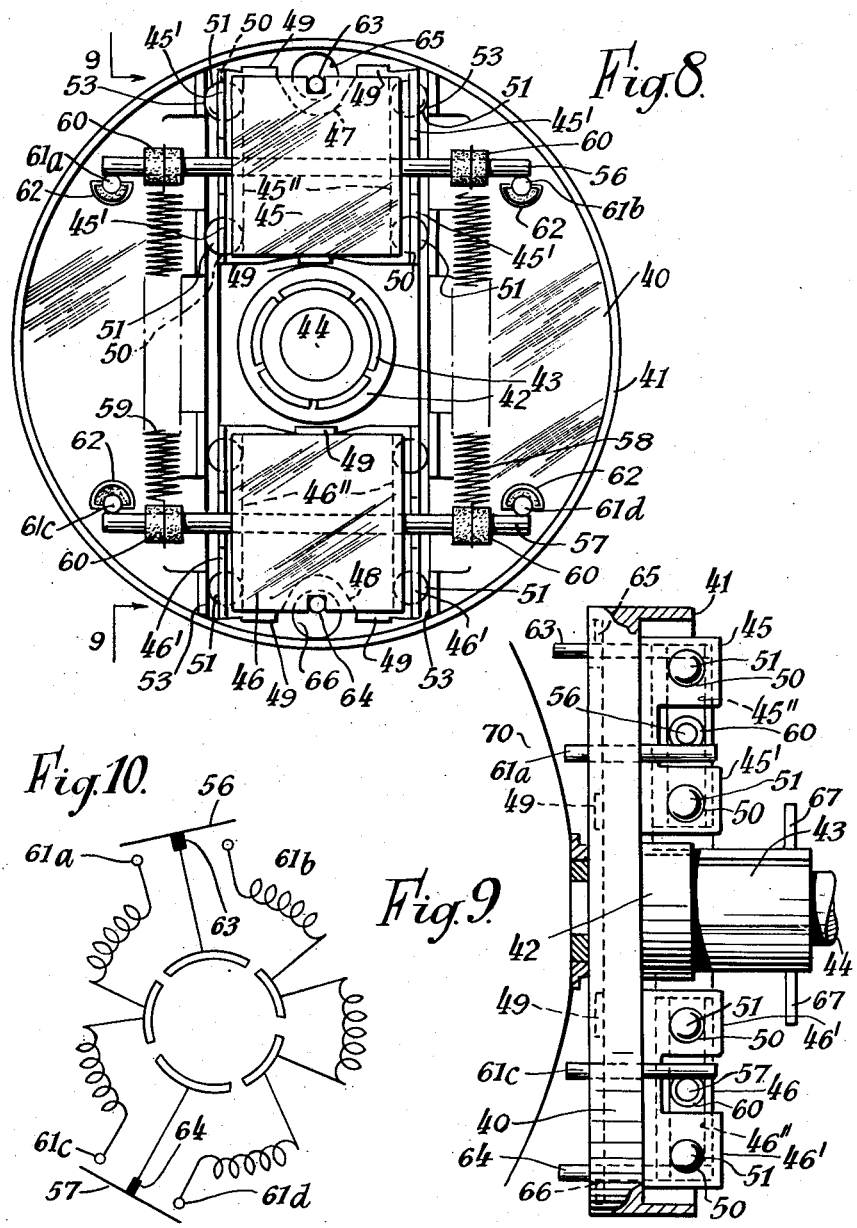
INVENTOR
Aubrey Lawrence Collins
BY
Stevens, Davis, Miller & Mosher
his ATTORNEYS

United States Patent Office 3,028,462
Patented Apr. 3, 1962

3,028,462
SPEED GOVERNOR FOR ELECTRIC MOTORS
Aubrey Lawrence Collins, Harrow, England, assignor to Limit Engineering Group Limited, London, England, a British company
Filed Nov. 5, 1958, Ser. No. 771,976
Claims priority, application Great Britain Nov. 27, 1957
12 Claims. (Cl. 200—80)

This invention relates to speed governors for electric motors and has for its object to provide a simple form of speed governor for such motors. The invention is especially advantageous when applied to very small motors but is not limited thereto.

It is often desired to govern the speed of electric motors, for example, ordinary shunt, series or compound wound machines operating from a direct current supply or so-called universal motors, which are usually series wound and which may be operated either from a direct or an alternating supply. The invention may also be applied to motors having permanent magnet fields or separately excited fields.

The invention consists of a speed governor for an electric motor comprising one or more centrifugal elements each carrying at least one electric contact and mounted for rotation with the motor armature or rotor, a contact member associated with each electric contact, and resilient means for normally maintaining contact between each electric contact and its associated contact member, in operation electrical connection to the armature or rotor winding being made via each electric contact and associated contact member so that when at least one centrifugal element flies outwardly under the influence of centrifugal force the electric circuit through the armature or rotor is broken and the armature or rotor is caused to slow down until contact is re-made.

In order that the invention may be clearly understood it will now be further described in conjunction with the accompanying drawings, in which:

FIGURE 1 shows a front view of one embodiment of the invention;

FIGURE 2 shows a section on the line A—A of FIGURE 1;

FIGURE 3 shows diagrammatically the connections for the armature windings of the embodiment of FIGURES 1 and 2;

FIGURE 4 shows a governor mounted on the end of the armature remote from the commutator;

FIGURE 5 shows a front view of another embodiment of the invention;

FIGURE 6 shows a front view of a still further embodiment of the invention;

FIGURE 7 shows a part sectional view taken on the line 7—7 of FIGURE 6;

FIGURES 8 and 9 show front and part sectional views respectively of a modification of the embodiment of FIGURES 6 and 7; and FIGURE 10 shows diagrammatically the connections for the armature windings of the embodiment of FIGURES 8 and 9.

Referring to FIGURES 1 and 2, a governor comprises a casing in the form of a circular disc 10, which may conveniently be moulded from a plastic material, having an upturned peripheral edge 11. The casing 10 has an inner sleeve 12 which is cut away at two points as shown in FIGURE 1. Sleeve 12 is a tight fit on a commutator 13 which is mounted on the armature spindle and which acts as a contact member for the governor. Two pins 14 and 14' are moulded integrally with casing 10 and form pivots for centrifugal weights 15 and 15'. Weight 15 has a counterbored hole 16 which serves as anchorage for one end of a spring 17 and a second hole 18 in which an insulating bush 19 is secured. Bush 19 serves as anchorage for one end of a second spring 20. Weight 15' has a hole 21 containing an insulating bush 22 which serves as anchorage for the other end of spring 17 and a counterbored hole 23 which serves as anchorage for the other end of spring 20. Each weight has a silver contact piece, 24 or 24', let into its edge adjacent commutator 13. Springs 17 and 20 serve to keep contacts 24 and 24' in contact with commutator 13, but as one end of each spring is carried in an insulated bush the springs make no electrical connection between the weights. A cover 25 is fitted into a rebate in the periphery of casing 10 and may conveniently be a disc of a transparent plastic material. Casing 10 and cover 25 may advantageously have small protrusions 26 (shown dotted in FIGURE 1) to enable weights 15 and 15' to move with a minimum of friction.

FIGURE 3 shows the windings of a conventional 5-pole armature for a direct current motor. Normally the ends of all the coils are connected directly to the commutator segments as shown in FIGURE 3 and indicated at 29 in FIGURE 2. According to the invention, two of the coil ends, 27 and 28 in FIGURE 3, are not connected directly but are brought out as shown at 27 in FIGURE 2. These leads pass through holes in casing 10 and lead 27 is connected to weight 15 at a point 30 whilst lead 28 is connected to weight 15' at a point 30'. Contacts 24 and 24' respectively make contact with the commutator segments to which leads 27 and 28 must be connected. The governor casing may conveniently be a tight push fit on commutator 13 and may be mounted adjacent to armature 30.

If the motor is running and its speed rises above a certain level then one or other of the weights 15 and 15' begins to pivot about pin 14 or 14' respectively, and to fly out under the influence of centrifugal force. As soon as it moves it breaks contact with the commutator or contact member, thus interrupting the armature circuit. This cuts off the power from the motor, which at once begins to slow down. The springs then pull back the weight which has moved, thus re-establishing contact and restoring power to the armature.

If all parts were perfectly made and the weights were exactly balanced then the two weights would theoretically break contact at the same instant and the armature circuit would be broken at two points. It is only necessary to break the circuit at one point to reduce the torque of the motor, but the provision of two moving contacts has certain advantages. In the practical case balance is not quite perfect and one weight always moves first, so that its contact may in time become worn or burned away. The associated weight is then allowed to move a little nearer to the axis of rotation. This reduces its radius of gyration and, in consequence, reduces the effect of centrifugal force. Eventually the other weight moves first, so that the other contact takes over duty. If, for any reason, one of the contacts should stick, the other will continue to function. Thus the use of two weights and contacts provides longer life and increased reliability. Further should the motor tend to overspeed when the armature circuit is broken only at one point, the motor would be brought into its governed speed when the armature circuit is broken at the second point.

FIGURE 4 shows another embodiment of the governor according to the invention in which the governor is mounted directly on spindle 31 at the opposite end of armature 30. The casing has an inner sleeve 32 which is a tight fit on spindle 31 and is not cut away as in the construction of FIGURE 1. The ends of the armature coils are all connected directly to the commutator segments in the conventional manner, but a break is made in two of the coils and the four ends are brought out and connected, two of them to the respective weights as described in connection with FIGURE 1 and the remaining two ends to a split metal ring 34 which is used in place of the commutator. This split metal ring 34 constituting the contact member is fitted over the sleeve 32 and the contacts on the weights make contact with this ring. When either of the weights moves out under the influence of centrifugal force the circuit through the armature is broken. In all other respects the governor of FIGURE 4 is identical with that of FIGURE 1.

FIGURE 5 shows a further embodiment which is particularly suitable for use with very small motors. The casing, which may be of similar form to that shown in FIGURES 1 and 2, is provided with two supports 35 and 35', which may be formed integrally with the casing, to which leaf springs 36, 36' are attached by any convenient means and are bent to the form shown. The free ends of the leaf springs carry electric contacts 37, 37' respectively and if necessary weights 38, 38' may be fitted to provide the required characteristics. In operation, when the motor speed rises above the desired level, one or other of the contacts breaks contact with the commutator segment and so breaks the armature circuit. This governor may also be arranged in the manner described in conjunction with FIGURE 4.

The governor shown in the FIGURE 6 embodiment of the invention consists of a casing 40 in the form of a circular disc moulded from plastic material and having an upturned peripheral edge 41. The disc is provided with a central sleeve 42 which is cut away at two points as shown in FIGURE 6. The bore of the sleeve 42 makes a tight fit on the commutator 43 mounted on the armature shaft 44 of an electric motor, the armature of which is represented at 70, said commutator forming the contact member for the governor. Mounted diametrically opposite on said disc are a pair of metal centrifugal weights 45 and 46 mounted for sliding movement in a radial direction. Each centrifugal weight 45, 46 has an electric contact 54, 55 respectively, preferably of silver or silver plated, embedded in it and which extends through one of the two cut away portions in said sleeve 42 and which is normally held in engagement with one of the commutator segments by spring tension applied to said weights, as will be described in detail hereinafter.

Each of said centrifugal weights 45, 46 is preferably rectangular in shape and is mounted for sliding movement in metal U-shaped members 47, 48 secured to the inner face of said disc 40 by metal tabs 49 passed through apertures in the disc and bent over on the outer face of the disc. The side members 45' and 46' of said U-shaped members are each provided with circular apertures 50 in which ball bearings 51 are held loosely. The ball bearings engage grooves 45'', 46'' formed in the sides of said centrifugal weights 45, 46 respectively, the ball bearings being retained in the apertures by upstanding projections 53 formed integrally with disc 40.

Passing through bores formed in each centrifugal weight 45, 46 in a direction at right angles to the direction of sliding movement are crossbars 56, 57 respectively of insulating material which project from the weights outwardly beyond both side members of said U-shaped members through suitable cut-away portions provided therein. A pair of spiral springs 58, 59 are anchored at their ends to corresponding ends of said crossbars 56, 57 so as to draw said weights together and urge said electrical contacts 54, 55 into engagement with the contact member of commutator 43.

Secured in a groove formed in the side of each centrifugal weight 45, 46, remote from said electrical contacts 54, 55 is a stiff wire 63, 64 respectively, which extends through an aperture 65, 66 respectively in the disc for making electrical contact between the armature windings and said contacts 54, 55. The approximate position of the normal brush gear for the commutator is indicated diagrammatically at 67 (FIGURE 7).

The method of connecting a five pole armature winding to the various contacts of the governor shown in FIGURES 6 and 7 is the same as that for the previous embodiments described. That is, the ends 27, 28 (FIGURE 3) are connected to stiff wires 63, 64 respectively and normally make contact with the commutator segments via weights 45, 46 and contacts 54, 55 respectively.

If the motor is running and its speed rises above a certain level then one or both of the weights 47, 48 begins to fly out under the influence of centrifugal force. As soon as it moves outwardly, the electrical contacts are separated from their associated contact member, thus interrupting the armature circuit. This cuts off the power from the motor, which at once begins to slow down. The springs 58, 59 then pull back each weight which has moved, thus re-establishing contact and restoring power to the armature.

The embodiment of the invention shown in FIGURES 8 and 9 of the drawings is substantially the same as the embodiment shown in FIGURES 6 and 7 and in these drawings like reference numerals indicate like parts. In the embodiment of FIGURES 8 and 9, however, the contacts 54, 55 and their corresponding cut-away portions in sleeve 42 are omitted and the crossbars 56, 57 are of metal, the springs 58, 59 being insulated therefrom by insulating sleeves 60. The two crossbars 56, 57 constitute electrical contacts which normally rest, under the tension of said springs, against metal pins 61a, 61b and 61c, 61d respectively, half embedded in upstanding projections 62 formed integrally with said disc and extending perpendicularly through said circular disc, the metal pins constituting contact members.

The governor of FIGURES 8 and 9 is connected in the armature circuit as shown in FIGURE 10. The ends of armature coils normally connected to a common commutator segment are separated and connected instead to a pair of metal pins, e.g. pins 61a, 61b, upon which the metal crossbar 56 normally rests. The commutator segment to which the ends of these coils would normally be connected is flexibly connected instead to the stiff wire 63. Thus whilst a crossbar is resting on its associated contact members the circuit through the associated armature coils is complete, this circuit being broken when the crossbar is caused to separate from its associated contact members by centrifugal force.

In the embodiments shown in FIGURES 6, 7, 8 and 9 it has been found advisable to limit the movement of the centrifugal elements to the minimum and to allow for one element to operate in advance of another and to limit its movement so that a reference point is established for the spring anchorage when the second weight operates. Doing this maintains the radius of gyration of the weights in close limits, thus ensuring that both centrifugal elements will operate at nearly the same number of revolutions per minute. Suitable means may be provided for adjusting the movement of the centrifugal element to give the best results.

For purposes of suppression the casing 10 or 40 could be moulded in a material which has a relatively low electrical resistance instead of an insulating material. Alternatively, the moulding could be provided with "resistance" paths connecting each electric contact with its associated contact member, the resistance value in both cases being sufficient to absorb the energy of the spark.

What is claimed is:
1. For an electric motor having a rotor, a speed governor for rotation with the rotor of the electric motor including at least a pair of centrifugal elements, at least one electric contact directly mounted on each centrifugal element for movement therewith, a contact member operatively associated with each electric contact and resilient means disposed between said centrifugal elements for normally maintaining contact between each electric contact and its associated contact member, said pair of centrifugal elements being disposed in line one on each side of the axis of rotation, and means mounting each centrifugal element for sliding movement only of the centrifugal element in a radial direction, said governor being adapted for making electrical connection to the rotor winding by means of each electric contact and associated contact member whereby when at least one centrifugal element is caused to move radially outwardly under the influence of centrifugal force the electric circuit through the rotor winding is broken and the rotor is caused to slow down until contact is remade.

2. A governor according to claim 1, in which said mounting means for permitting sliding movement of each centrifugal element in a radial direction includes a U-shaped member.

3. A governor according to claim 2, in which each centrifugal element is substantially rectangular in shape and each has a side at right angles to the direction of sliding movement.

4. For an electric motor having a rotor, a speed governor for rotation with the rotor of the electric motor including a least a pair of centrifugal elements, at least one electric contact mounted on each centrifugal element, a contact member operatively associated with each electric contact and resilient means disposed between said centrifugal elements for normally maintaining contact between each electric contact and its associated contact member, said pair of centrifugal elements being disposed in line one on each side of the axis of rotation, and means mounting each centrifugal element for sliding movement of the centrifugal element in a radial direction, said governor being adapted for making electrical connection to the rotor winding by means of each electric contact and associated contact member whereby when at least one centrifugal element is caused to move radially outwardly under the influence of centrifugal force the electric circuit through the rotor winding is broken and the rotor is caused to slow down until contact is remade, said mounting means for permitting sliding movement of each centrifugal element in a radial direction including a U-shaped member, each centrifugal element being substantially rectangular in shape and each having a side at right angles to the direction of sliding movement, each of the sides of each centrifugal element parallel to the direction of sliding movement being provided with a groove extending the length of the side, and a pair of ball bearings loosely housed in separate apertures formed in the corresponding side member of the U-shaped member and engaging said grooves.

5. A governor as claimed in claim 4, in which said resilient means comprises a pair of helical springs, each end of each spring engaging the corresponding end of a pair of crossbars passing one through each of said centrifugal elements in a direction transverse to the direction of sliding movement, said side members of each U-shaped member having a gap formed centrally therein and through which the crossbars pass.

6. A governor as claimed in claim 5, in which a casing for the governor is formed with a sleeve adapted to make a tight sliding fit on a commutator of the electric motor which forms said contact maker.

7. A governor as claimed in claim 6, in which each electric contact is set in the edge of the corresponding centrifugal element nearest the other centrifugal element.

8. A governor as claimed in claim 7, in which each of said centrifugal elements is formed of electrically conductive material and each of said crossbars of insulating material.

9. A governor as claimed in claim 8, in which there is secured to the side of each centrifugal weight parallel to the side adjacent said sleeve a metal pin extending through an aperture formed in said casing, each such pin serving for making electrical connection to the corresponding centrifugal element.

10. A governor as claimed in claim 6, in which each of said centrifugal elements and each of said crossbars are formed of electrically conductive material, each crossbar having a sleeve of insulating material disposed around it where an end of said springs is secured thereto, said crossbars each constituting said electric contacts and each normally engaging at their ends a pair of upstanding metal pins forming contact members.

11. A governor as claimed in claim 10, in which there is secured to the side of each centrifugal element parallel to the side adjacent said sleeve a metal pin extending through an aperture formed in said casing, each such pin serving for making electrical connection to the corresponding centrifugal element.

12. A governor as claimed in claim 6, in which said casing is provided with resistance paths connecting said electric contacts with the associated contact members, the resistance value of said paths being sufficient to absorb the energy of an electric spark.

References Cited in the file of this patent

UNITED STATES PATENTS

| | | |
|---|---|---|
| 1,897,405 | Thompson | Feb. 14, 1933 |
| 1,935,304 | Weber | Nov. 14, 1933 |
| 2,473,998 | Janette | June 21, 1949 |
| 2,814,770 | Tourtellot | Nov. 26, 1957 |
| 2,819,441 | Buck | Jan. 7, 1958 |
| 2,848,676 | Sidell | Aug. 19, 1958 |